Figure 1:
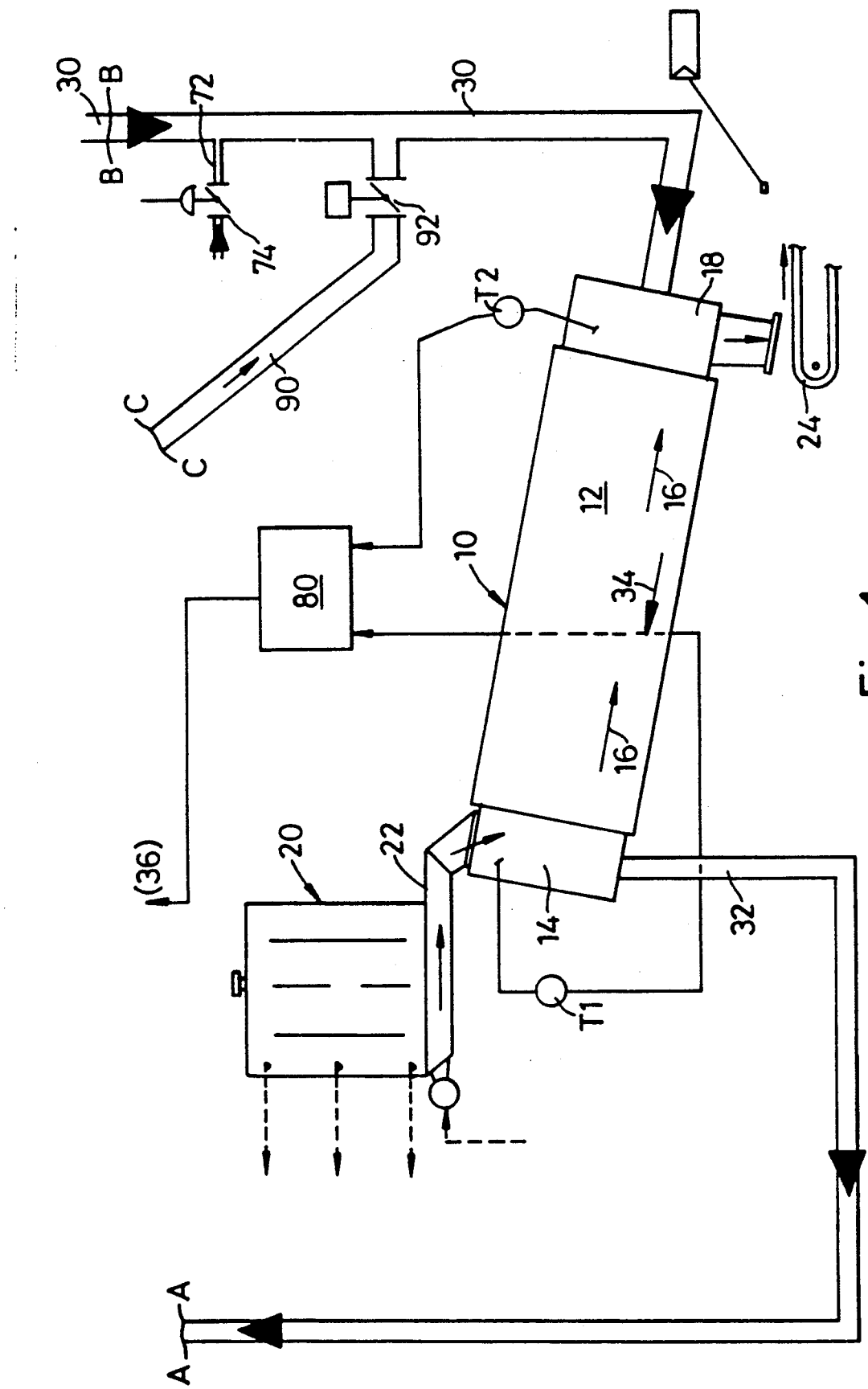

United States Patent [19]

Perry

[11] Patent Number: 5,055,037
[45] Date of Patent: Oct. 8, 1991

[54] HEAT PROCESSING APPARATUS

[75] Inventor: Ophneil H. Perry, Kingswinford, England

[73] Assignee: Stein Atkinson Stordy Limited, England

[21] Appl. No.: 500,681

[22] Filed: Mar. 28, 1990

[30] Foreign Application Priority Data

Mar. 28, 1989 [GB] United Kingdom ............... 8906935

[51] Int. Cl.⁵ .......................... F27B 7/02; F27D 7/00
[52] U.S. Cl. ..................................... 432/72; 432/106
[58] Field of Search ............. 432/107, 106, 72, 111, 432/112, 113

[56] References Cited

U.S. PATENT DOCUMENTS

| | | | |
|---|---|---|---|
| 2,743,529 | 5/1956 | Hayes | 432/72 |
| 3,619,908 | 11/1971 | Kallas | 34/56 |
| 3,947,235 | 3/1977 | Bomert | 432/72 |
| 4,016,003 | 4/1977 | Stauffer | 134/19 |
| 4,098,007 | 7/1978 | Davis et al. | 432/72 |
| 4,326,342 | 4/1982 | Schregenberger | 432/72 |
| 4,411,695 | 10/1983 | Twyman | 75/44 |
| 4,767,320 | 8/1988 | Sasaki et al. | 432/72 |
| 4,784,069 | 11/1988 | Stark | 432/72 |
| 4,859,177 | 8/1989 | Kreisberg et al. | 432/106 |

FOREIGN PATENT DOCUMENTS 1488749 12/1977 United Kingdom .
1556220 11/1979 United Kingdom .
2025589 1/1980 United Kingdom .

*Primary Examiner*—Henry C. Yuen
*Attorney, Agent, or Firm*—Learman & McCulloch

[57] ABSTRACT

Apparatus includes a kiln (10) through the chamber (12) of which is passed a flow of scrap material, e.g. aluminium can scrap, for heat processing e.g. removal of lacquer and other contaminants, and gas circulation means having a heater (40) providing inflow of hot gases to the kiln, an outlet flue (32) leading off exhaust gases from the kiln with recirculation of at least part of the latter gases to the inflow, and a fan (36) or other flow inducing means for effecting circulation, preferably by suction with respect to the kiln, with flow through the latter in the opposite direction to the feed of material, and at least a temperature sensor (TI) at the material input end of the kiln for automatic regulation of the throughput of gases to regulate the kiln temperature.

9 Claims, 2 Drawing Sheets

HEAT PROCESSING APPARATUS

This invention relates to apparatus for heat processing of scrap materials in the recovery of their useful constituents and removal as by vaporisation or burning of contaminants such as lacquer or paint coatings. The invention is particularly but not exclusively applicable to scrap metal materials, for example in the recycling of metal containers typically aluminium or aluminium alloy beverage cans.

With the increasing emphasis now placed on protection of the environment and conservation of energy and natural resources the need for economical and efficient processing of waste materials for recycling assume ever greater importance. Moreover the recycling processes themselves must be conducted in a manner which does not lead to atmospheric or other pollution.

Various forms of heat processing and apparatus used in scrap recycling processes are known. For example in the de-lacquering of aluminium alloy beverage can scrap it is known to provide heated furnace kilns through which the scrap material is passed on a flat bed conveyor. Rotary kilns have also been used for this purpose but these known processes and apparatus have not always proved satisfactory and economical in use. The vaporised lacquer and similar coatings are toxic and great care has to be taken to prevent their escape into the atmosphere which introduces complications in the sealing of the furnace kiln while permitting continuous throughput of the material, particularly if the operative gas pressure within the furnace chamber is above ambient atmospheric pressure.

Furthermore the operating temperature in said chamber needs to be maintained at an optimum level for effective and economical processing without wasting energy but the known apparatus has not always operated consistently in this respect, for example the operating temperature may not be held due to variations in the makeup and contamination of the material, feed of a batch of wet and dirty material may cause an unacceptable drop in operating temperature which the control systems of known apparatus are unable to correct with sufficiently speedy response.

The object of the invention is to provide heat processing apparatus for handling scrap materials which is economical to provide, construct and operate, which is efficient and reliable in operation, and which is particularly effective in providing consistent and pollution-free continuous processing.

According to the invention there is provided apparatus for heat processing of scrap material to separate contaminants therefrom comprising:

a) a kiln defining an enclosed furnace chamber having a feed path extending therethrough between a material input and a material output along which a continuous flow of the material is passed in use; and B) gas circulation means including a heater for providing a supply of heated gases, an inlet duct for passing a said gases into the chamber, an outlet flue for removal of exhaust gases from the chamber, a recirculation connection between the outlet flue and the inlet duct for operative recirculation of at least part of said exhaust gases through the furnace, flow inducing means for forced movement of gases through the furnace, and control means for regulating the operating temperature of said gases: characterised in that i) said feed path is disposed in relation to the flow of gases in the furnace so that the material passes therethrough in the opposite direction of travel to the gas flow;

ii) said control means includes sensor means providing a read out of temperature within the furnace chamber at least at or adjacent to the material input and preferably at or adjacent to both said input and the material output; and iii) said control means operates to govern the throughput rate of the flow inducing means in response to said read-out of said temperature or temperatures to provide feed-back regulation of said operating temperature effective within the furnace chamber.

Preferably the flow inducing means operates to induce a drop in pressure within the chamber below the ambient atmospheric pressure to cause through flow by suction and reduce the likelihood of gases, in particular the exhaust gases carrying pollutant or toxic vaporised contaminants, escaping from the kiln to atmosphere.

Said flow inducing means may be an enclosed fan, preferably acting in the outlet flue, and said throughput rate is governed by regulating the speed of the fan.

The heater may conveniently included a burner for the more effective high temperature disposal or breaking down of the contaminant content of the exhaust gases eg at a higher temperature than the operating temperature within the furnace chamber. In the latter case cooling means may be provided acting on the gases passing through the inlet duct to the chamber to reduce their temperature to a predetermined level. Said cooling means may comprise means for injection of water into said flow and/or means for introducing a bypass flow of a proportion of the exhaust gases from the input upstream of the heater so that they are at a lower temperature then the output from the heater.

Figure 2:
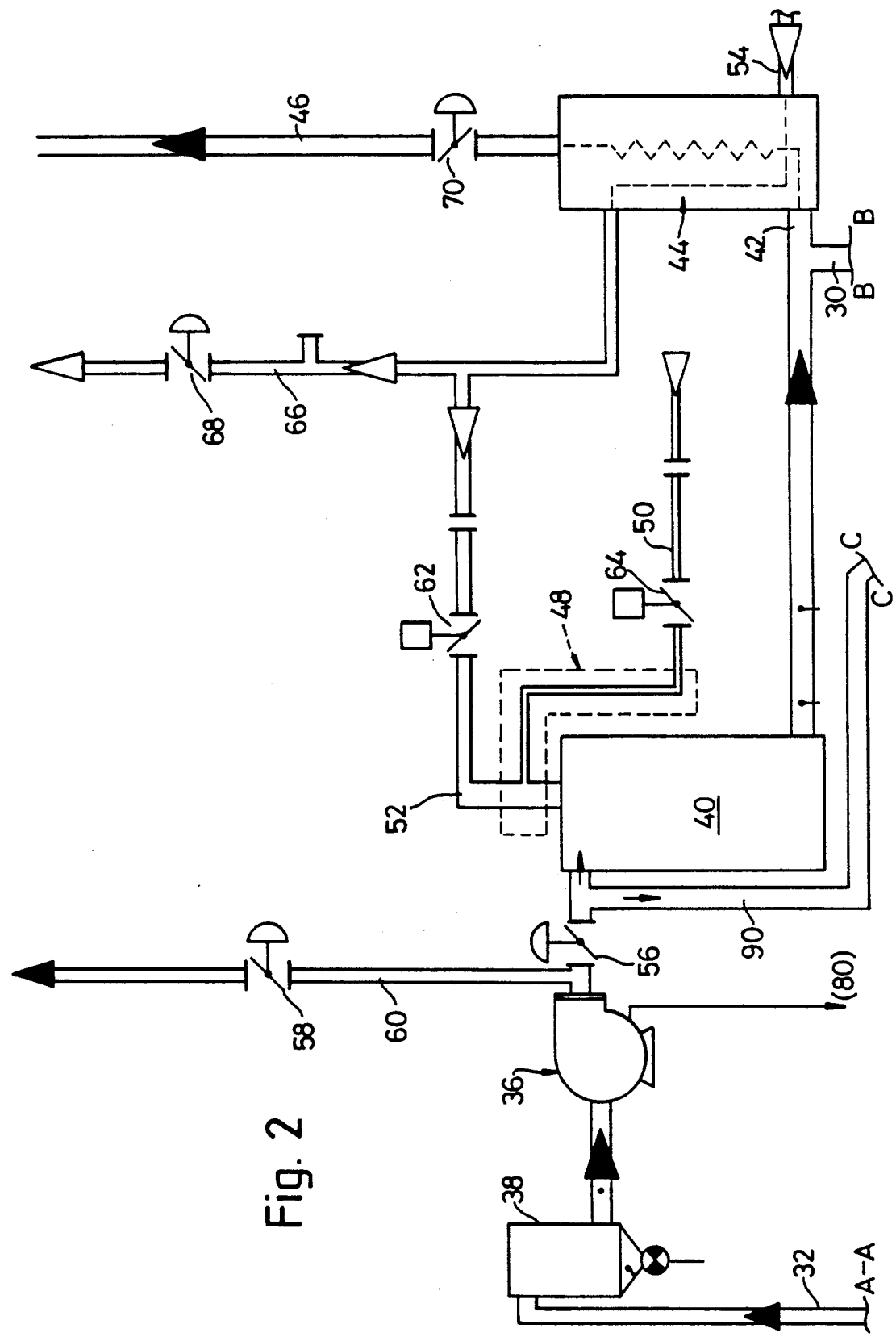

An embodiment of the invention is now more particularly described with reference to the accompanying drawings wherein FIG. 1 is a diagrammatic elevation of a kiln and ancillary equipment of heat processing apparatus, and FIG. 2 is a diagram of gas circulation and exhaust equipment of said apparatus associated with said kiln.

The connections between sections of common ducting shown in the two figures are indicated at A—A, B—B, and C—C.

The apparatus shown in this example is for the heat processing of aluminium alloy beverage can scrap for removal from the shredded scrap material of lacquer coating and other contaminants prior to recovery and remelting of the metal content for recycling.

The apparatus comprises a rotary kiln 10 defining an enclosed furnace chamber 12. The axis of the kiln is inclined so that the scrap material, fed through an input cowling 14 at one end thereof passes through chamber 12 from left to right as viewed in FIG. 1 along a feed path indicated generally by the arrows 16, and exiting from the kiln lower end through an output cowling 18.

The shredded material is fed into the kiln from a bin 20 by way of a motor driven vibratory conveyor 22 to provide a substantially constant rate of feed in generally known manner. The output from cowling 18 drops onto an out feed conveyor 24 which removes it for sorting or grading and further processing.

The apparatus further includes gas circulation means the operative parts of which are mainly shown in FIG. 2. An inlet duct 30 has its downstream end connected through output cowling 18 of kiln 10 for operatively feeding hot gases into the lower end of the kiln and an outlet flue 32 leads from input cowling 14 to conduct the exhaust gases from the kiln which will include the vaporised lacquer and other residues of the contaminants. It will be noted that the direction of gas flow (indicated by the arrow 34) through furnace chamber 12 is opposite to the direction of feed of the scrap material therethrough.

For the most effective operation of this particular process it is desirable that the operating temperature in chamber 12 be maintained at an optimum level sufficient for effective removal of the lacquer and other contaminants for subsequent safe disposal but without reaching excessive temperatures. In the present example the temperature at the output cowling end of chamber 12 is controlled by way of the temperature of the incoming gases from duct 30 at substantially 650° C. (1200° F.), the temperature drop as the gases flow through chamber 12 being such that they are at a temperature of about 260° C. (500° F.) at the input cowling end of the kiln. The control of this operating temperature will be further referred to hereinafter.

The exhaust gases are drawn out of kiln 10 by powered flow inducing means in the form of an enclosed centrifugal powered fan 36 connected in flue 32 downstream of a cyclone device 38 for separating particles of solid matter from the gas flow.

From fan 36 said flow is operatively passed through an afterburner chamber 40, the out feed from the latter connecting with the inlet duct 30. A proportion of the gases leaving afterburner chamber 40 are bled off by way of a branch 42 to pass through a gas cooling heat exchanger 44 from which they exit by a secondary flue 46 to plant for their treatment and disposal (not shown).

Afterburner chamber 40 is heated by a burner 48 in which a mixture of gas fuel (fed by way of conventional control valves etc in a fuel duct 50) and air (fed through an air inlet duct 52) is burnt. The operating temperature in afterburner chamber 40 is such that the lacquer and other contaminant content of the exhaust gases is further broken down to facilitate disposal at an operating temperature higher than that in kiln 10, the temperature of the gases leaving chamber 40 is operatively around 760° C. (1400° F.).

The air supply to burner 48 is derived from an air input fan (not shown) through a connection 54 of heat exchanger 44, the air being passed through the latter for cooling the gas flow from branch 42 before passing to air inlet duct 52.

Safety control valves are incorporated in the ducting for shutting down the system if unsafe operating conditions are detected e.g. at 56 to close off the connection of flue 32 with afterburner chamber 40, at the same time a valve 58 in a waste gas outlet 60 can be opened; also at 62 and 64 in air inlet duct 52 and fuel duct 50 with facility for exhausting the heated air by way of an escape duct 66 when a valve 68 therein is opened; and a further valve 70 in secondary flue 46.

In order to cool gases input to furnace chamber 12 from the after burner in this example, water is injected into inlet duct 30 at 72 by way of a control valve 74.

The operating temperature in furnace chamber 12 will be affected by varying factors during operation e.g. the condition of the material entering the kiln, for example its moisture content, the composition of the scrap material itself, and the rate of throughput. In order to control the operating temperature within predetermined limits for optimum processing control means is provided including respective temperature sensors T1 and T2 at the input and output cowling ends 14,18 respectively of the furnace chamber. The temperature readings derived from these sensors are fed to a controller indicated diagrammatically at 80 and the latter operates to regulate the speed of fan 36, i.e. the throughput rate thereof, to provide feedback regulating the volume of hot gases input through duct 30 to the furnace chamber to maintain the required temperature therein. For some applications it is contemplated that only a single temperature sensor at or adjacent to the material input end of the kiln (i.e. the gas outflow end) might be needed.

The contra flow of gases through chamber 12 against the directional movement of the material provides much more efficient operation and more effective heating and the monitoring of the temperature of the gases as they leave the kiln provides feedback of furnace conditions after the gases have acted on the material and their temperature has been affected thereby thus providing much more accurate control of the operating temperature. It is contemplated that, with the use of the invention, a simpler construction of kiln 10 can be employed compared with known rotary kiln systems, the kiln can be substantially shorter in axial length for a given output thus reducing capital costs and space requirements and it need not have a high duty lining which is costly to provide and maintain.

The more balanced operation of the invention provides an almost constant flow rate of the gases for treatment fed from branch 42 to secondary flue 46 so that the treatment of the latter can be carried out in a consistent, economical and effective manner.

The action of fan 36 causes depression in flue 32 below ambient atmospheric pressure, i.e. the gases are sucked through furnace chamber 12 so that the operating pressure in the latter is also below atmospheric. This means that air will be drawn in through any gaps or opening in the cowlings 14,18 e.g. where the flow of material passes therethrough so that there will be no escape of toxic or noxious gas from the furnace to atmosphere and complex airlock, sealing means or the like to prevent leakage are not required and the escape of fumes or smoke is prevented.

In the illustrated construction, for even greater efficiency, the cooling effect provided by infeed of cooling water to inlet duct 30 is supplemented by a bypass infeed of cooler recirculated gases. A bypass duct 90 feeds a proportion of the exhaust gases from the output side of fan 36 upstream of afterburner chamber 40 but on the downstream side of the safety control valve 56 directly into inlet duct 30 without passing through the afterburner chamber so as to have a cooling effect on the gases infed to kiln 10. Said bypass flow is controlledby a regulating valve 92 in duct 90. This provides greater thermal efficiency while maintaining the closed recirculation contra flow principal. However, for some applications the bypass duct 90 need not be provided, or it may be shut off for some operating modes.

The apparatus of the invention may have application to the heat processing of other scrap materials in recycling, not only other metallic scrap for example coated steel can or other scrap, aluminium alloy scrap from sources other than that referred to above e.g. scrap coated aluminium sheeting or cladding as used for buildings: but also mixed metallic and non-metallic scrap; or possibly wholly non-metallic scrap such as glass cullet or plastics materials, the operating temperatures being set at suitable levels.

What is claimed:

1. Apparatus for heat processing of scrap material to separate contaminants therefrom comprising:
   a) a kiln defining an enclosed furnace chamber having a feed path extending therethrough between a material input and a material output along which a continuous flow of the material is passed in use; and
   b) gas circulation means including a heater for providing a supply of heated gases, an inlet duct for passing said gases into the chamber, an outlet flue for removal of exhaust gases from the chamber, a recirculation connection between the outlet flue and the inlet duct for operative recirculation of at least part of said exhaust gases through the furnace, flow inducing means for forced movement of gases through the furnace, and control means for regulating the operating temperature of said gases: characterised in that
   i) said feed path is disposed in relation to the flow of gases in the furnace so that the material passes therethrough in the opposite direction of travel to the gas flow;
   ii) said control means includes sensor means providing a read out of temperature within the furnace chamber at least at or adjacent to the material input;
   iii) said control means operates to govern the throughput rate of the flow inducing means in response to said read-out of said temperature or temperatures to provide feedback regulation of said operating temperature effective within the furnace chamber; and
   iv) said flow inducing means being in communication with said outlet flue for inducing in use a drop in pressure within said chamber to a level below that of ambient atmospheric pressure.

2. Apparatus as in claim 1 wherein the sensor means provides a read-out of temperature at or adjacent to both the material input and output.

3. Apparatus as in claim 1 wherein the flow inducing means is an enclosed fan.

4. Apparatus as in claim 3 wherein said throughput rate is governed by regulating the operative speed of the fan.

5. Apparatus as in claim 1 wherein the heater includes a burner for high temperature disposal or breaking down of contaminant content of the exhaust gases in use.

6. Apparatus as in claim 5 including cooling means for acting on the gases passing through the inlet duct into the chamber.

7. Apparatus as in claim 6 wherein said cooling means includes means for injection of water into said gases.

8. Apparatus as in claim 6 wherein said cooling means includes a bypass duct connected between the outlet flue and the inlet duct bypassing the heater for infeed of a selected proportion of cooler gases to said inlet duct.

9. Apparatus as in claim 1 wherein the kiln is a rotary kiln.

* * * * *